United States Patent
Osby

(10) Patent No.: US 10,465,023 B2
(45) Date of Patent: Nov. 5, 2019

(54) PROCESSES TO PREPARE ETHYLENE-BASED POLYMERS WITH IMPROVED MELT-STRENGTH

(71) Applicant: Dow Global Technologies LLC, Midland, MI (US)

(72) Inventor: John O. Osby, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 5 days.

(21) Appl. No.: 15/574,315

(22) PCT Filed: May 9, 2016

(86) PCT No.: PCT/US2016/031410
§ 371 (c)(1),
(2) Date: Nov. 15, 2017

(87) PCT Pub. No.: WO2016/209381
PCT Pub. Date: Dec. 29, 2016

(65) Prior Publication Data
US 2018/0134825 A1    May 17, 2018

Related U.S. Application Data

(60) Provisional application No. 62/183,814, filed on Jun. 24, 2015.

(51) Int. Cl.
*C08F 210/02* (2006.01)
*C08F 4/38* (2006.01)
(Continued)

(52) U.S. Cl.
CPC ........ *C08F 210/02* (2013.01); *C08F 2800/10* (2013.01)

(58) Field of Classification Search
CPC .... C08F 210/02; C08F 210/16; C08F 210/06; C08F 4/38; C08F 2/38; C08F 2222/1013;
(Continued)

(56) References Cited

U.S. PATENT DOCUMENTS 3,542,749 A   11/1970  Anspon
4,370,517 A    1/1983  Soma et al.
(Continued)

FOREIGN PATENT DOCUMENTS

EP   1999170 A1   12/2008
WO   9107761 A1    5/1991
(Continued)

OTHER PUBLICATIONS

Tung, L. H. et al., "Preparation of Polystyrene with Long Chain Branches via Free Radical Polymerization," J. Polym. Sci., Polym. Chem. Ed., (1981) vol. 19, pp. 2027-2039.
(Continued)

*Primary Examiner* — William K Cheung
(74) *Attorney, Agent, or Firm* — Dinsmore & Shohl LLP

(57) ABSTRACT

The invention provides a process to form an ethylene-based polymer, and said ethylene-based polymer, said process comprising polymerizing a reaction mixture comprising ethylene and at least the following A) and B): A) a Rheology Modifying Agent (RMA) selected from the following i) through v), as described herein; B) at least one comonomer selected from the following a) through c), as described herein.

10 Claims, 1 Drawing Sheet

(51) Int. Cl.
*C08F 2/38* (2006.01)
*C08F 210/16* (2006.01)
*C08F 210/06* (2006.01)

(58) Field of Classification Search
CPC .............. C08F 2500/11; C08F 2500/12; C08F 2500/10
USPC .......................................................... 526/64
See application file for complete search history.

(56) References Cited

U.S. PATENT DOCUMENTS

| | | | |
|---|---|---|---|
| 5,539,075 | A | 7/1996 | Gustafsson et al. |
| 5,844,045 | A | 12/1998 | Kolthammer et al. |
| 5,869,575 | A | 2/1999 | Kolthammer et al. |
| 6,448,341 | B1 | 9/2002 | Kolthammer et al. |
| 6,538,070 | B1 | 3/2003 | Cardwell et al. |
| 6,545,088 | B1 | 4/2003 | Kolthammer et al. |
| 6,566,446 | B1 | 5/2003 | Parikh et al. |
| 8,598,276 | B2 | 12/2013 | Demirors et al. |
| 9,150,681 | B2 | 10/2015 | Osby et al. |
| 2008/0242809 | A1 | 10/2008 | Neuteboom et al. |
| 2009/0253878 | A1 | 10/2009 | Ye et al. |
| 2013/0063960 | A1 | 3/2013 | Nakano et al. |
| 2013/0237678 | A1 | 9/2013 | Osby et al. |
| 2014/0072100 | A1 | 3/2014 | Eun et al. |
| 2014/0072138 | A1 | 3/2014 | Yamkovoy |
| 2014/0072214 | A1 | 3/2014 | Tanaka et al. |
| 2015/0037324 | A1 | 2/2015 | Reyes et al. |
| 2015/0197590 | A1 | 7/2015 | Osby |
| 2015/0344599 | A1 | 12/2015 | Osby et al. |

FOREIGN PATENT DOCUMENTS

| | | | |
|---|---|---|---|
| WO | WO 91/07761 | * | 5/1991 |
| WO | 9745465 | A1 | 12/1997 |
| WO | 0168723 | A2 | 9/2001 |
| WO | 0214379 | A1 | 2/2002 |
| WO | 2006094723 | A1 | 9/2006 |
| WO | 2007110127 | A1 | 10/2007 |
| WO | 2011017248 | A1 | 2/2011 |
| WO | 2012084787 | A1 | 6/2012 |
| WO | 2014003837 | A1 | 1/2014 |
| WO | 2015100302 | A1 | 7/2015 |
| WO | 2015100318 | A1 | 7/2015 |
| WO | 2015100351 | A1 | 7/2015 |
| WO | 2015200426 | A1 | 12/2015 |
| WO | 2015200430 | A1 | 12/2015 |
| WO | 2016209381 | A1 | 12/2016 |

OTHER PUBLICATIONS

Tung, L. H., "Branching Kinetics in Coploymenrization of Styrene with a Chain-Transfer Monomer," J. Polym Sci., Dolym. Chem Ed., (1981) vol. 19, pp. 3209-3217.
Liu, J. et al., Branched Polymer via Free Radical Polymerization of Chain Transfer Monomer: A Theoretical and Experimental Investigation, J. Polym Sci., Part A., Polym. Chem., (2007) vol. 46, pp. 1449-1459.
Altuntas E., et al., J. Polym Sci., Part A, Polym. Chem 2013, vol. 51, pp. 1595-1605.
International Search Report and Written Opinion issued by the U.S. Patent and Trademark Office as International Searching Authority for International Application No. PCT/US2016/031410 dated Aug. 3, 2016.
Mortimer, George, "Chain Transfer in Ethylene Polymerization; VII: Very Reactive and Depletable Transfer Agents," Journal of Polymer Science Part A-1, vol. 10, pp. 163-168 (1972).
Mortimer, George, "Chain transfer in ethylene polymerization, Part V, The effect of pressure," Journal of Polymer Science Part A-1, vol. 8, pp. 1543-1548 (1970).
Groto, S., et al., "Computer model for commercial high pressure polyethylene reactor based on elementary reaction rates obtained experimentally," Journal of Applied Polymer Science; Applied Polymer Symposium, vol. 36, pp. 21-40 (1981).
Yamamoto, K., et al., "Rate constant for long chain-chain branch formation in free-radical polymerization of ethylene," J. Macromol. Science-Chem., A13 (8), pp. 1067-1080 (1979).
Ehrlich, P., et al., "Fundamentals of the free radical polymerization of ethylene," Adv. Polymer Sci., vol. 7, pp. 386-448 (1970).
Mortimer, George, Chain transfer in ethylene polymerization, Journal of Polymer Science Part A-1, vol. 4, pp. 881-900 (1966).
Mortimer, George, Chain transfer in ethylene polymerization, Part IV, Additional study at 1360 atm and 130degrees C., Journal of Polymer Science Part A-1, vol. 8, pp. 1513-1523 (1970).
Mortimer, George, "Chain transfer in ethylene polymerization, Part V, The effect of temperature," Journal of Polymer Science Part A-1, vol. 8, pp. 1535-1542 (1970).

* cited by examiner

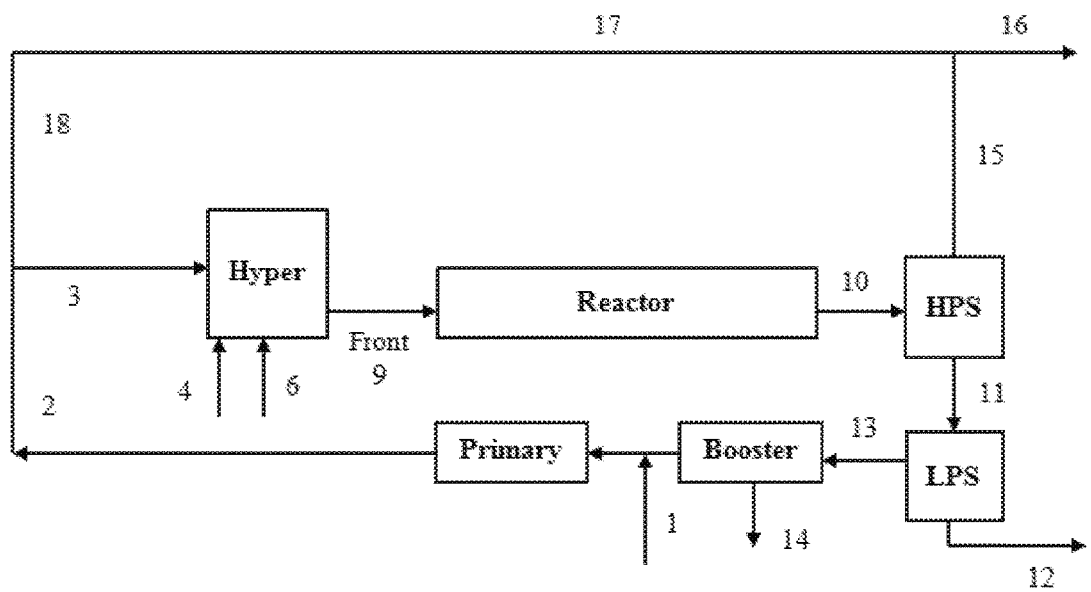

PROCESSES TO PREPARE ETHYLENE-BASED POLYMERS WITH IMPROVED MELT-STRENGTH

REFERENCE TO RELATED APPLICATIONS

This application is U.S. national stage entry under 35 U.S.C. § 371 of PCT International Patent Application No. PCT/US 2016/031410, filed May 9, 2016, which claims the benefit of U.S. Provisional Patent Application No. 62/183,814, filed Jun. 24, 2015, the contents of each of which are incorporated herein by reference into the subject application.

BACKGROUND

Conventional low density polyethylene (LDPE) has good processability; however, when used in film application, increased melt strength is still desired. International Publication WO 2012/084787 discloses a process for preparing ethylene copolymers in the presence of free-radical polymerization initiator, at pressures in the range of from 160 MPa to 350 MPa, and temperatures in the range of from 100° C. to 350° C., in a tubular reactor by copolymerizing ethylene, a bi- or multifunctional comonomer and optionally further comonomers. The bi- or multifunctional comonomer bears at least two different functional groups, of which at least one is an unsaturated group, which can be incorporated into the growing polymer chain, and at least another functional group can act as chain transfer agent in radical ethylene polymerization.

International Publication No. WO 2006/094723 discloses a process for the preparation of a copolymer of ethylene and a monomer copolymerizable therewith. The polymerization takes place in a tubular reactor at a peak temperature between 290° C. and 350° C., the comonomer is a di- or higher functional (meth) acrylate and the comonomer is applied in an amount between 0.008 mol % and 0.200 mol % relative to the amount of ethylene copolymer.

JP61028685B2 (Abstract) discloses straight chain ethylene random copolymers containing ethylene, and a polyalkylene glycol monoacrylate and other ethylenic unsaturated monomers. These ethylene random copolymers are disclosed as having excellent hygroscopicity and antistatic properties, and compatibility with polyolefins.

International Publication WO 2014/003837 discloses an ethylene-based polymer formed from reacting at least the following: ethylene and at least one asymmetrical polyene, comprising an "alpha, beta unsaturated end" and a "C—C double bond end," and wherein the reaction takes place in the presence of at least one free-radical initiator.

U.S. Pat. No. 4,370,517 discloses preparing a graft polymer of polyethylene and a polyfunctional monomer such as methoxy-polyethylene glycol methacrylate or polyethylene glycol dimethacrylate for use in electrical cable insulation for the suppression of water tree formation. U.S. Publication No. 2008/0242809 discloses a process for the preparation of a copolymer of ethylene and a comonomer, and where the polymerization takes place in a tubular reactor, at a peak temperature between 290° C. and 350° C. The comonomer is a di- or higher functional (meth)acrylate, and the co monomer is used in an amount between 0.008 mole percent and 0.200 mole percent, relative to the amount of ethylene copolymer.

U.S. Pat. No. 5,539,075 discloses the polymerization of ethylene and at least one monomer, which is copolymerizable with ethylene, and includes a polyunsaturated comonomer having a chain of at least eight carbon atoms and at least two non-conjugated double bonds, of which at least one is terminal. The polymerization takes place at a pressure of about 100-300 MPa, and a temperature of about 80°-300° C., under the action of a radical initiator. The polyunsaturated comonomer preferably is an α,ω-alkadiene having 8-16 carbon atoms, and most preferred 1,9-decadiene. Apart from the polyunsaturated comonomer, the polymerization may also involve another vinyl-unsaturated monomer, preferably containing at least one functional group selected from hydroxyl groups, alkoxy groups, carbonyl groups, carboxyl groups and ester groups.

Additional polymers and processes using comonomers and/or agents that affect polymer rheology are disclosed in the following references. International Publication Nos. WO 2007/110127, WO 1997/045465, WO 2012/084787, WO 2015/100302, WO 2015/100318, WO 2015/100351, WO 2015/200426, WO 2015/200430; U.S. Pat. No. 3,542,749; U.S. Patent Publication 2013/0237678; U.S. Patent Publication 2009/0253878; EP 1999170A1; Tung, L. H., et al., *Preparation of Polystyrene with Long Chain Branches via Free Radical Polymerization*. J. Polym. Sci., Polym. Chem. Ed., (1981), 19, 2027-39; Tung, L. H., *Branching Kinetics in Copolymerization of Styrene with a Chain -Transfer Monomer* , J. Polym. Sci., Polym. Chem. Ed., (1981), 19, 3209-3217; Liu, J., et al., *Branched Polymer via Free Radical Polymerization of Chain Transfer Monomer: A Theoretical and Experimental Investigation* , J. Polym. Sci. Part A: Polym. Chem., (2007), 46, 1449-59.

However, as discussed, there remains a need for ethylene-based polymers, such as high pressure (≥100 MPa), free-radical polymerized ethylene-based polymers, with improved melt strength, especially for film and extrusion coating applications. This need and others have been met by the following invention.

SUMMARY OF THE INVENTION

The invention provides a process to form an ethylene-based polymer, said process comprising polymerizing a reaction mixture comprising ethylene and at least the following A) and B):

A) a Rheology Modifying Agent (RMA) selected from the following i) through v):

i) RMA1:

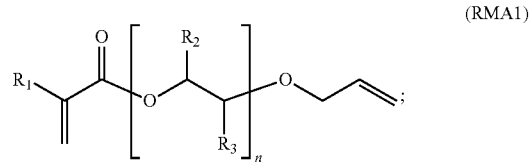

wherein, for RMA1, R1 is H or alkyl, n is from 1 to 50, R2 is selected from H or an alkyl, and R3 is selected from H or an alkyl;

ii) RMA2:

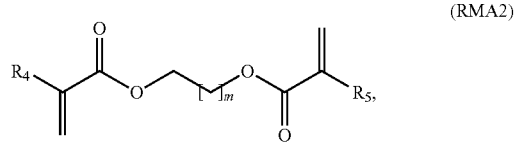

wherein, for RMA2, R4 and R5 are each independently H or an alkyl, and m is from 1 to 50;

iii) RMA3:

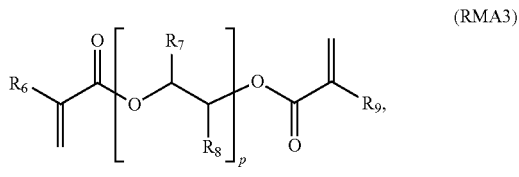

wherein, for RMA3, R6 and R9 are each independently H or an alkyl, p is from 1 to 50; R7 is selected from H or an alkyl, and R8 is selected from H or an alkyl;

iv) RMA4:

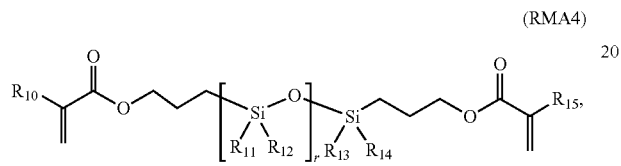

wherein, for RMA4, R10 and R15 are each independently H or an alkyl, r is from 1 to 100;
R11 is selected from H or an alkyl, R12 is selected from H or an alkyl, R13 is selected from H or an alkyl, R14 is selected from H or an alkyl;

v) any combination of two or more of i) through iv); and

B) at least one comonomer selected from the following a) through c);

a) comonomer 1:

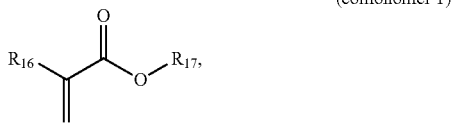

wherein, for comonomer 1, R16 is H or alkyl, and R17 is selected from H or an alkyl;

b) comonomer 2:

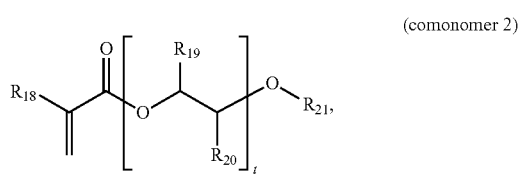

wherein, for comonomer 2, R18 and R21 are each independently H or an alkyl, t is from 1 to 50; R19 is selected from H or an alkyl, and R20 is selected from H or an alkyl;

c) a combination of a) and b).

The invention also provides a composition comprising an ethylene-based polymer, which comprising at least the following A') and B'):

A') one or more units derived from at least one Rheology Modifying Agent (RMA) selected from the following i) through v):

i) RMA1:

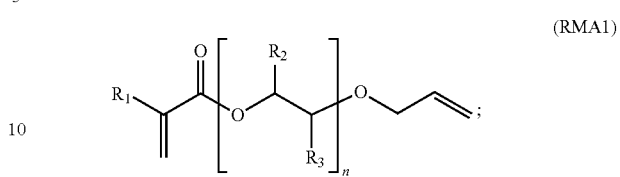

wherein, for RMA1, R1 is H or alkyl, n is from 1 to 50, R2 is selected from H or an alkyl, and R3 is selected from H or an alkyl;

ii) RMA2:

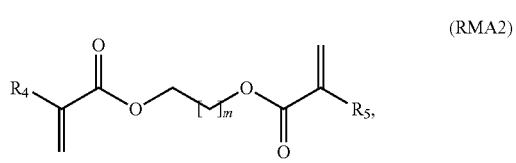

wherein, for RMA2, R4 and R5 are each independently H or an alkyl, and m is from 1 to 50;

iii) RMA3: SR,

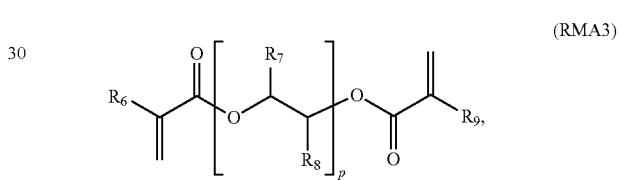

wherein, for RMA3, R6 and R9 are each independently H or an alkyl, p is from 1 to 50; R7 is selected from H or an alkyl, and R8 is selected from H or an alkyl;

iv) RMA4:

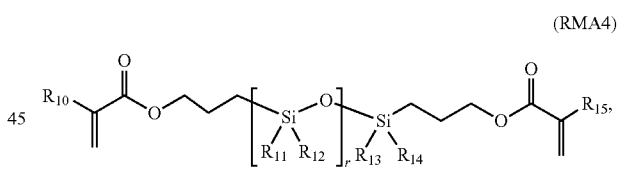

wherein, for RMA4, R10 and R15 are each independently H or an alkyl, r is from 1 to 100;
R11 is selected from H or an alkyl, R12 is selected from H or an alkyl, R13 is selected from H or an alkyl, R14 is selected from H or an alkyl;

v) any combination of two or more of i) through iv); and

B') one or more units derived from at least one comonomer selected from the following a) through c);

a) comonomer 1:

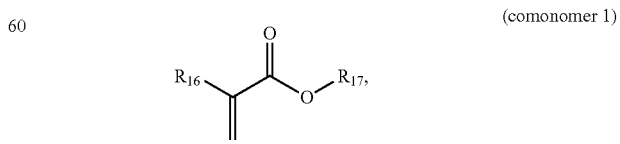

wherein, for comonomer 1, R16 is H or alkyl, and R17 is selected from H or an alkyl;

b) comonomer 2:

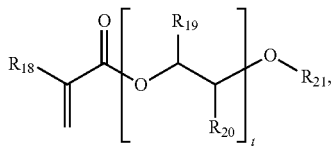
(comonomer 2)

wherein, for comonomer 2, R18 and R21 are each independently H or an alkyl, t is from 1 to 50; R19 is selected from H or an alkyl, and R20 is selected from H or an alkyl;

c) a combination of a) and b).

BRIEF DESCRIPTION OF THE DRAWINGS

The FIGURE depicts a polymerization scheme for an inventive polymerization using a tubular reactor.

DETAILED DESCRIPTION

As discussed above, the invention provides a process to form an ethylene-based polymer, said process comprising polymerizing a reaction mixture comprising ethylene and at least the following A) and B):

A) a Rheology Modifying Agent (RMA) selected from the following i) through v):

i) RMA1:

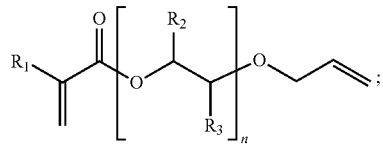
(RMA1)

wherein, for RMA1, R1 is H or alky, and further H or a C1-C4 alkyl, and further a H or methyl, and further methyl; n is from 1 to 50, further from 1 to 20, further from 5 to 20; R2 is selected from H or an alkyl, and further H or a C1-C4 alkyl, and further a H or methyl, and further H; and R3 is selected from H or an alkyl, and further H or a C1-C4 alkyl, and further a H or methyl, and further H;

ii) RMA2:

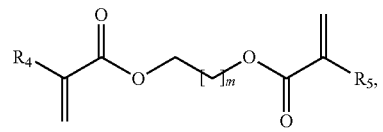
(RMA2)

wherein, for RMA2, R4 and R5 are each, independently, H or an alkyl, and further H or a C1-C4 alkyl, and further a H or methyl, and further methyl; and m is from 1 to 50, further from 1 to 20, further from 5 to 20;

iii) RMA3:

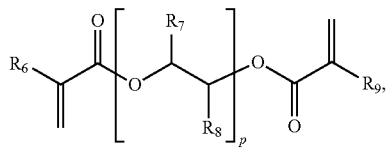
(RMA3)

wherein, for RMA3, R6 and R9 are each, independently, H or an alkyl, and further H or a C1-C4 alkyl, and further a H or methyl, and further methyl; p is from 1 to 50, further from 1 to 20, further from 5 to 20; R7 is selected from H or an alkyl, and further H or a C1-C4 alkyl, and further a H or methyl, and further H; and R8 is selected from H or an alkyl, and further H or a C1-C4 alkyl, and further a H or methyl, and further H;

iv) RMA4:

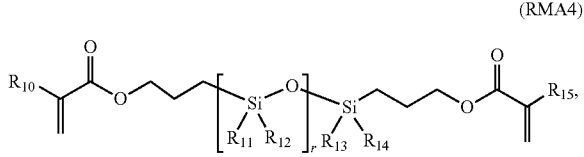
(RMA4)

wherein, for RMA4, R10 and R15 are each, independently, H or an alkyl, and further H or a C1-C4 alkyl, and further a H or methyl, and further methyl; r is from 1 to 100, further from 1 to 70, further from 1 to 50, further from 5 to 30; R11 is selected from H or an alkyl, and further H or a C1-C4 alkyl, and further a H or methyl, and further methyl; R12 is selected from H or an alkyl, and further H or a C1-C4 alkyl, and further a H or methyl, and further methyl; R13 is selected from H or an alkyl, and further H or a C1-C4 alkyl, and further a H or methyl, and further methyl; R14 is selected from H or an alkyl, and further H or a C1-C4 alkyl, and further a H or methyl, and further methyl;

v) any combination of two or more of i) through iv); and

B) at least one comonomer selected from the following a) through c);

a) comonomer 1:

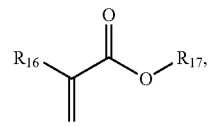
(comonomer 1)

wherein, for comonomer 1, R16 is H or alkyl, and further H or a C1-C4 alkyl, and further a H or methyl, and further methyl; and R17 is selected from H or an alkyl, and further H or a C1-C20 alkyl, and further a C1-C20 alkyl;

b) comonomer 2:

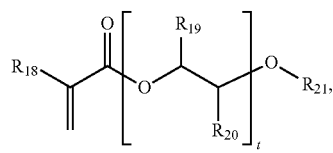
(comonomer 2)

wherein, for comonomer 2, R18 and R21 are each, independently, H or an alkyl, and further H or a C1-C4 alkyl, and further a H or methyl, and further methyl; t is from 1 to 50, further from 1 to 20, further from 5 to 20; R19 is selected from H or an alkyl, and R20 is selected from H or an alkyl, and further H or a C1-C4 alkyl, and further a H or methyl, and further H;

c) a combination of a) and b).

An inventive process may comprise a combination of two or more embodiments as described herein.

In one embodiment, the reaction mixture further comprises at least one free-radical initiator.

In one embodiment, the polymerization takes place at a pressure greater than, or equal to, 100 MPa.

In one embodiment, for the inventive process, the polymerization takes place in a reactor configuration comprising the following: a) an autoclave reactor, b) a tubular reactor, or c) an autoclave reaction in combination with a tubular reactor.

In one embodiment, the component A) is a Rheology Modifying Agent (RMA) selected from i), ii), iii) or v).

In one embodiment, component A) is a Rheology Modifying Agent (RMA) selected from ii), iii) or v).

In one embodiment, component A) is a Rheology Modifying Agent (RMA) selected from iii). In a further embodiment, component B) is selected from comonomer 2.

In one embodiment, the polymerization takes place in at least one tubular reactor or at least one autoclave.

In one embodiment, the process takes place in a reactor configuration comprising at least one tubular reactor.

In one embodiment, the polymerization pressure is greater than, or equal to, 100 MPa. In a further embodiment, the polymerization takes place at least one pressure from 150 MPa to 350 MPa. In a further embodiment, the polymerization takes place at least one temperature from 100° C. to 380° C. In a further embodiment, the process takes place in a reactor configuration comprising at least one tubular reactor.

In one embodiment, the polymerization takes place in at least one autoclave.

In one embodiment, component A) is added to the polymerization (incoming ethylene stream) in an amount from 0.001 to 0.300 mole percent, further from 0.003 to 0.300 mole percent, based on the total moles of ethylene, component A) and component B) added to the polymerization. In a further embodiment, the polymerization takes place in two reactors. In another embodiment, the polymerization takes place in one reactor.

The invention also provides a composition comprising the ethylene-based polymer formed from an inventive process or an inventive process of one or more embodiments as described herein. In one embodiment, the composition comprises ≥92 weight percent, or ≥95 weight percent, or ≥98 weight percent, or ≥99 weight percent of the ethylene-based polymer, based on the weight of the composition.

In one embodiment, the ethylene-based polymer comprises at least the following A') and B'):

A') one or more units derived from at least one Rheology Modifying Agent (RMA) selected from the following i) through v):

i) RMA1:

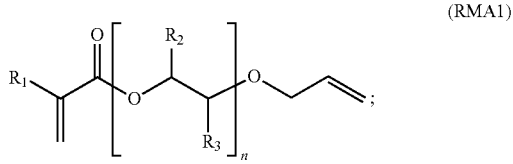

wherein, for RMA1, R1 is H or alky, and further H or a C1-C4 alkyl, and further a H or methyl, and further methyl; n is from 1 to 50, further from 1 to 20, further from 5 to 20; R2 is selected from H or an alkyl, and further H or a C1-C4 alkyl, and further a H or methyl, and further H; and R3 is selected from H or an alkyl, and further H or a C1-C4 alkyl, and further a H or methyl, and further H;

ii) RMA2:

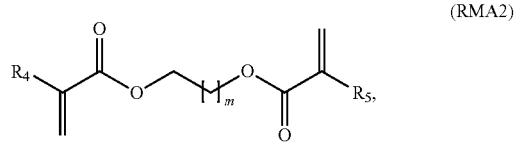

wherein, for RMA2, R4 and R5 are each, independently, H or an alkyl, and further H or a C1-C4 alkyl, and further a H or methyl, and further methyl; and m is from 1 to 50, further from 1 to 20, further from 5 to 20;

iii) RMA3:

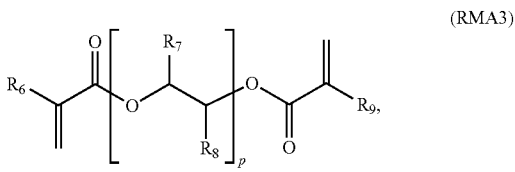

wherein, for RMA3, R6 and R9 are each, independently, H or an alkyl, and further H or a C1-C4 alkyl, and further a H or methyl, and further methyl; p is from 1 to 50, further from 1 to 20, further from 5 to 20; R7 is selected from H or an alkyl, and further H or a C1-C4 alkyl, and further a H or methyl, and further H; and R8 is selected from H or an alkyl, and further H or a C1-C4 alkyl, and further a H or methyl, and further H;

iv) RMA4:

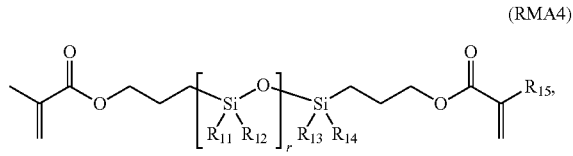

wherein, for RMA4, R10 and R15 are each, independently, H or an alkyl, and further H or a C1-C4 alkyl, and further a H or methyl, and further methyl; r is from 1 to 100, further from 1 to 70, further from 1 to 50, further from 5 to 30; R11 is selected from H or an alkyl, and further H or a C1-C4 alkyl, and further a H or methyl, and further methyl; R12 is selected from H or an alkyl, and further H or a C1-C4 alkyl, and further a H or methyl, and further methyl; R13 is selected from H or an alkyl, and further H or a C1-C4 alkyl, and further a H or methyl, and further methyl; R14 is selected from H or an alkyl, and further H or a C1-C4 alkyl, and further a H or methyl, and further methyl;

v) any combination of two or more of i) through iv); and

B') one or more units derived from at least one comonomer selected from the following a) through c);

a) comonomer 1:

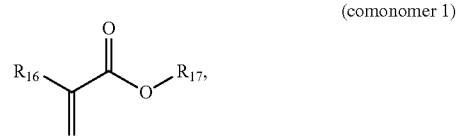

wherein, for comonomer 1, R16 is H or alkyl, and further H or a C1-C4 alkyl, and further a H or methyl, and further methyl; and R17 is selected from H or an alkyl, and further H or a C1-C20 alkyl, and further a C1-C20 alkyl;

b) comonomer 2:

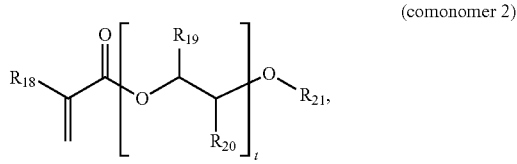

wherein, for comonomer 2, R18 and R21 are each, independently, H or an alkyl, and further H or a C1-C4 alkyl, and further a H or methyl, and further methyl; t is from 1 to 50, further from 1 to 20, further from 5 to 20; R19 is selected from H or an alkyl, and R20 is selected from H or an alkyl, and further H or a C1-C4 alkyl, and further a H or methyl, and further H;

c) a combination of a) and b).

In one embodiment, the ethylene-based polymer comprises at least one structure selected from the Structure 1:

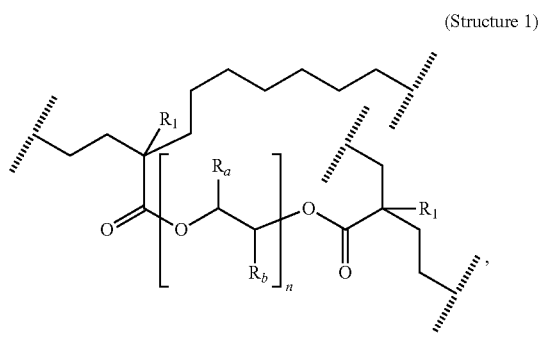

wherein, for Structure 1, n is from 1 to 50, from 1 to 20, further from 5 to 20; R1 is selected from H or alkyl, Ra is selected from H or alkyl, and Rb is selected from H or alkyl. In the above Structure 1, the notation " ⁓⁓⁓ " represents a break at the center of a covalent carbon-carbon bond in the hydrocarbon backbone portion of the ethylene-based polymer.

In one embodiment, the ethylene-based polymer comprises, in polymerized for, ≥92 weight percent ethylene, or ≥95 weight percent ethylene, or ≥98 weight percent ethylene, or ≥99 weight percent ethylene, based on the weight of the polymer.

In one embodiment, the ethylene-based polymer is a high pressure (≥100 MPa), free-radical polymerized ethylene-based polymer. In a further embodiment, the polymer comprises, in polymerized for, ≥92 weight percent ethylene, or ≥95 weight percent ethylene, or ≥98 weight percent ethylene, or ≥99 weight percent ethylene, based on the weight of the polymer.

In one embodiment, the composition further comprises at least one additive.

In one embodiment, the composition further comprises at least one other polymer. For example, the other polymer differs from the inventive ethylene-based polymer in one or more properties, for example, density, melt index (I2), Mw, Mn or Mw/Mn.

The invention also provides an article comprising at least one component formed from an inventive composition of one or more embodiments described herein. In one embodiment, the article is a film or a coating.

In one embodiment, the article is a film.

In one embodiment, the article is a coating, and further an extrusion coating.

The invention also provides a composition comprising an ethylene-based polymer, which comprising at least the following A') and B'):

A') one or more units derived from at least one Rheology Modifying Agent (RMA) selected from the following i) through v):

i) RMA1:

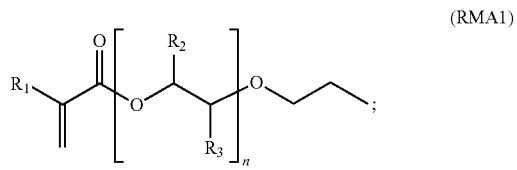

wherein, for RMA1, R1 is H or alky, and further H or a C1-C4 alkyl, and further a H or methyl, and further methyl; n is from 1 to 50, further from 1 to 20, further from 5 to 20; R2 is selected from H or an alkyl, and further H or a C1-C4 alkyl, and further a H or methyl, and further H, and R3 is selected from H or an alkyl, and further H or a C1-C4 alkyl, and further a H or methyl, and further H;

ii) RMA2:

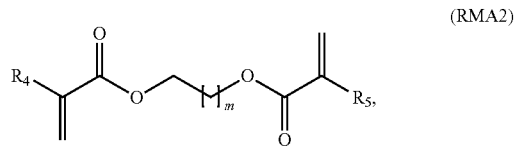

wherein, for RMA2, R4 and R5 are each, independently, H or an alkyl, and further H or a C1-C4 alkyl, and further a H or methyl, and further methyl; and m is from 1 to 50, further from 1 to 20, further from 5 to 20;

iii) RMA3:

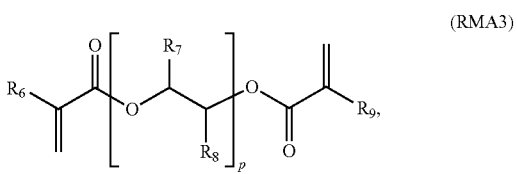

wherein, for RMA3, R6 and R9 are each, independently, H or an alkyl, and further H or a C1-C4 alkyl, and further a H or methyl, and further methyl; p is from 1 to 50, further from 1 to 20, further from 5 to 20; R7 is selected from H or an alkyl, and further H or a C1-C4 alkyl, and further a H or methyl, and further H; and R8 is selected from H or an alkyl, and further H or a C1-C4 alkyl, and further a H or methyl, and further H;

iv) RMA4:

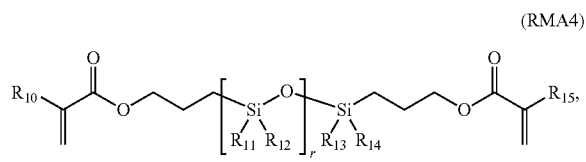
(RMA4)

wherein, for RMA4, R10 and R15 are each, independently, H or an alkyl, and further H or a C1-C4 alkyl, and further a H or methyl, and further methyl; r is from 1 to 100, further from 1 to 70, further from 1 to 50, further from 5 to 30; R11 is selected from H or an alkyl, and further H or a C1-C4 alkyl, and further a H or methyl, and further methyl; R12 is selected from H or an alkyl, and further H or a C1-C4 alkyl, and further a H or methyl, and further methyl; R13 is selected from H or an alkyl, and further H or a C1-C4 alkyl, and further a H or methyl, and further methyl; R14 is selected from H or an alkyl, and further H or a C1-C4 alkyl, and further a H or methyl, and further methyl;

v) any combination of two or more of i) through iv); and

B') one or more units derived from at least one comonomer selected from the following a) through c);

a) comonomer 1:

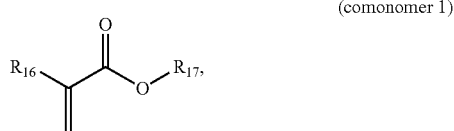
(comonomer 1)

wherein, for comonomer 1, R16 is H or alkyl, and further H or a C1-C4 alkyl, and further a H or methyl, and further methyl; and R17 is selected from H or an alkyl, and further H or a C1-C4 alkyl, and further a H or methyl, and further methyl;

b) comonomer 2:

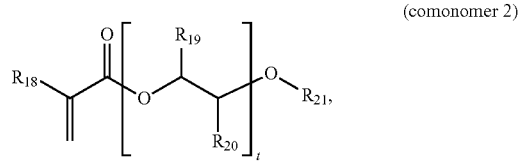
(comonomer 2)

wherein, for comonomer 2, R18 and R21 are each, independently, H or an alkyl, and further H or a C1-C4 alkyl, and further a H or methyl, and further methyl; t is from 1 to 50, further from 1 to 20, further from 5 to 20; R19 is selected from H or an alkyl, and R20 is selected from H or an alkyl, and further H or a C1-C4 alkyl, and further a H or methyl, and further H;

c) a combination of a) and b).

An inventive composition may comprise a combination of two or more embodiments as described herein.

In one embodiment, the component A') is a Rheology Modifying Agent (RMA) selected from i), ii), iii) or v).

In one embodiment, component A') is a Rheology Modifying Agent (RMA) selected from ii), iii) or v).

In one embodiment, component A') is a Rheology Modifying Agent (RMA) selected from iii). In a further embodiment, component B') is selected from comonomer 2.

In one embodiment, the ethylene-based polymer comprises at least one structure selected from the Structure 1:

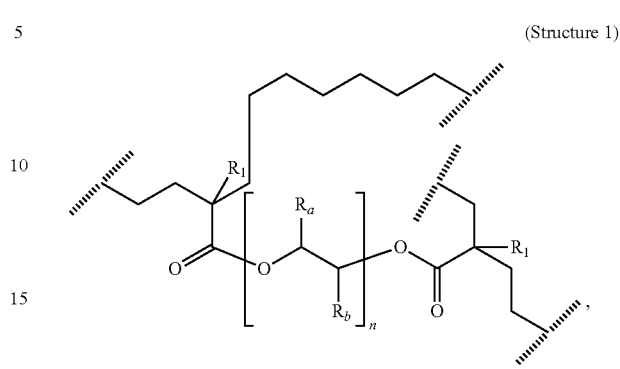
(Structure 1)

wherein, for Structure 1, n is from 1 to 50, from 1 to 20, further from 5 to 20; R1 is selected from H or alkyl, Ra is selected from H or alkyl, and Rb is selected from H or alkyl. In the above Structure 1, the notation represents a break at the center of a covalent carbon-carbon bond in the hydrocarbon "⸺" backbone portion of the ethylene-based polymer.

In one embodiment, the composition further comprises at least one additive.

In one embodiment, the composition further comprises at least one other polymer. For example, the other polymer differs from the inventive ethylene-based polymer in one or more properties, for example, density, melt index (I2), Mw, Mn or Mw/Mn.

The invention also provides an article comprising at least one component formed from an inventive composition of one or more embodiments described. In one embodiment, the article is a film or a coating.

In one embodiment, the article is a film.

In one embodiment, the article is a coating, and further an extrusion coating.

For both the inventive process and the inventive composition, the ethylene-based polymer may comprise a combination of two or more embodiments as described herein.

In one embodiment, the ethylene-based polymer is a high pressure (≥100 MPa), free-radical polymerized ethylene-based polymer. In a further embodiment, the polymer comprises, in polymerized for, ≥92 weight percent ethylene, or ≥95 weight percent ethylene, or ≥98 weight percent ethylene, or ≥99 weight percent ethylene, based on the weight of the polymer.

In one embodiment, the ethylene-based polymer comprises, in reacted form, greater than, or equal to, 0.050 moles of the rheology modifying agent per 1000 moles of ethylene-based polymer backbone carbons, and greater than, or equal to 0.050 moles of comonomer per 1000 moles of ethylene-based backbone carbons, based on the weight of the polymer. In a further embodiment, the ethylene-based polymer is a high pressure (≥100 MPa), free-radical polymerized ethylene-based polymer. In a further embodiment, the polymer comprises, in polymerized for, ≥92 weight percent ethylene, or ≥95 weight percent ethylene, or ≥98 weight percent ethylene, or ≥99 weight percent ethylene, based on the weight of the polymer.

In one embodiment, the ethylene-based polymer comprises, in reacted form, less than, or equal to, 10 moles of the rheology modifying agent per 1000 moles of ethylene-based polymer backbone carbons, and less than, or equal to 10 moles of comonomer per 1000 moles of ethylene-based polymer back bone carbons, based on the weight of the polymer. In a further embodiment, the ethylene-based polymer is a high pressure (≥100 MPa), free-radical polymerized ethylene-based polymer. In a further embodiment, the polymer comprises, in polymerized for, ≥92 weight percent ethylene, or ≥95 weight percent ethylene, or ≥98 weight percent ethylene, or ≥99 weight percent ethylene, based on the weight of the polymer.

In one embodiment, the ethylene-based polymer comprises, in reacted form, at least 0.03 weight percent of the rheology modifying agent, and at least 0.03 weight percent of the comonomer based on the weight of the polymer. In a further embodiment, the ethylene-based polymer is a high pressure (≥100 MPa), free-radical polymerized ethylene-based polymer. In a further embodiment, the polymer comprises, in polymerized for, ≥92 weight percent ethylene, or ≥95 weight percent ethylene, or ≥98 weight percent ethylene, or ≥99 weight percent ethylene, based on the weight of the polymer.

In one embodiment, the ethylene-based polymer has a melt index ($I_2$) from 0.3 to 100 g/10 min, or from 0.5 to 50 g/10 min, or from 0.8 to 20 g/10 min, or from 1.0 to 10 g/10 min.

In one embodiment the ethylene-based polymer has a density greater than, or equal to, 0.900, or greater than, or equal to, 0.905, or greater than, or equal to, 0.910, grams per cubic centimeter (g/cc or $g/cm^3$).

In one embodiment the ethylene-based polymer has a density less than, or equal to, 0.950, or less than, or equal to, 0.940, or less than, or equal to, 0.930, grams per cubic centimeter (g/cc or $g/cm^3$).

In one embodiment the ethylene-based polymer has a density from 0.900 to 0.950, or from 0.905 to 0.940, or from 0.910 to 0.930, g/cc.

An inventive ethylene-based polymer may comprise a combination of two or more embodiments as described herein.

An inventive composition may comprise a combination of two or more embodiments as described herein.

An inventive article may comprise a combination of two or more embodiments as described herein.

An inventive process may comprise a combination of two or more embodiments as described herein.

Process

For producing a highly branched ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), or from 1000 to 2000 meters. The beginning of a reaction zone, for either type of reactor, is typically defined by the side injection of either initiator of the reaction, ethylene, chain transfer agent (or telomer), comonomer(s), as well as any combination thereof. A high pressure process can be carried out in autoclave or tubular reactors having one or more reaction zones, or in a combination of autoclave and tubular reactors, each comprising one or more reaction zones. In one embodiment an initiator is injected into a reaction zone where free radical polymerization is to be induced.

Often a conventional chain transfer agent is used to control molecular weight. In a preferred embodiment, one or more conventional chain transfer agents (CTAs) are added to an inventive polymerization process. Typical CTA that can be used include, but are not limited to, propylene, isobutane, n-butane, 1-butene, methyl ethyl ketone, acetone, ethyl acetate, propionaldehyde, ISOPAR (ExxonMobil Chemical Co.), and isopropanol. In one embodiment, the amount of CTA used in the process is from 0.03 to 10 weight percent of the total reaction mixture.

In one embodiment, the polymerization may take place in a tubular reactor as described in international patent application PCT/US12/059469, filed Oct. 10, 2012. This patent application describes a multi zone reactor which describes alternate locations of feeding fresh ethylene to control the ethylene to CTA ratio and therefore control polymer properties. Fresh ethylene may be simultaneously added in multiple locations to achieve the desired ethylene to chain transfer ratio. In a similar way addition of fresh CTA addition points may be carefully selected to control polymer properties as described in international patent application PCT/US12/064284 (filed Nov. 9, 2012). Fresh CTA may be simultaneously added in multiple locations to achieve the desired CTA to ethylene ratio. Likewise, the addition points and the amount of the rheology modifying agents, described in this application, may be controlled to control gels formation while maximizing the desired property of increased melt strength and performance in targeted applications. Fresh rheology modifying agent may be simultaneously added in multiple locations to achieve the desired rheology modifying agent to ethylene ratio. The use of a rheology modifying agent (or branching and or coupling agent) to broaden molecular weight distribution and to increase the melt strength of the polymer will put further requirements on the distribution of the CTA and the rheology modifying agent along a reactor system in order to achieve the desired change in product properties without or minimizing potential negative impacts like gel formation, reactor fouling, process instabilities, low efficiency of branching agent.

In one embodiment, the polymerization takes place in at least one tubular reactor. In the multi reactor system, the autoclave reactor usually precedes the tubular reactor. The addition points and amounts of fresh ethylene, fresh CTA, and fresh branching agent may be appropriately controlled to achieve the desired ratios of CTA to ethylene and rheology modifying agent to ethylene in the feeds to and or in the reaction zones.

In one embodiment, the rheology modifying agent is added to the polymerization in an amount from 0.001 to 0.300 mole percent, further from 0.003 to 0.300 mole percent, based on the total moles of ethylene and the rheology modifying agent added to the polymerization. In a further embodiment, the polymerization takes place in two reactors. In another embodiment, the polymerization takes place in one reactor with multiple or at least two reaction zones.

Ethylene used for the production of ethylene-based polymer may be purified ethylene, which is obtained by removing polar components from a loop recycle stream, or by using a reaction system configuration, such that only fresh ethylene is used for making the inventive polymer. It is not typical that purified ethylene is required to make ethylene-based polymer. In such cases ethylene from the recycle loop may be used. In one embodiment, the process includes a process recycle loop to improve conversion efficiency.

In one embodiment, the ethylene-based polymer comprises, in polymerized form, ethylene, a rheology modifying agent (component A), a comonomer (component B), and, optionally, one or more other comonomers, and further one other comonomer. Other comonomers include, but are not limited to, α-olefins, acrylates (other than component B), methacrylates (other than component B) and anhydrides, each typically having no more than 20 carbon atoms.

Initiators

Free radical initiators are generally used to produce the inventive ethylene-based polymers. Exemplary organic peroxides include, but are not limited to, cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. In one embodiment, these organic peroxy initiators are used in an amount from 0.001 to 0.2 weight percent, based upon the weight of polymerizable monomers.

In one embodiment, an initiator is added to at least one reaction zone of the polymerization, and wherein the initiator has a "half-life temperature at one second" greater than 255° C., preferably greater than 260° C. In a further embodiment, such initiators are used at a peak polymerization temperature from 320° C. to 350° C. In a further embodiment, the initiator comprises at least one peroxide group incorporated in a ring structure. Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent of the combined weight of one or more additives, based on the weight of the inventive polymer.

In one embodiment the polymers of this invention are treated with one or more stabilizers, for example, antioxidants, such as IRGANOX 1010, IRGANOX 1076 and IRGAFOS 168. In general, the polymers are treated with one or more stabilizers before extrusion or other melt processes.

An inventive composition may further comprise at least one other polymer, in addition to an inventive ethylene-based polymer. Blends and mixtures of the inventive polymer with other polymers may be prepared. Suitable polymers for blending with the inventive polymers include natural and synthetic polymers. Exemplary polymers for blending include propylene-based polymers (both impact modifying polypropylene, isotactic polypropylene, atactic polypropylene, and random propylene/ethylene copolymers), various types of ethylene-based polymers, including high-pressure, free-radical LDPE, heterogeneously branched LLDPE (typically via Ziegler-Natta catalysis), homogeneously branched linear or substantially linear PE (typically via single-site, including metallocene catalysis), including multiple reactor PE ("in-reactor" compositions of heterogeneously branched PE and homogeneously branched PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.), and U.S. Pat. No. 6,448,341 (Kolthammer et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Other ethylene-based polymers include homogeneous polymers, such as olefin plastomers and elastomers (for example, polymers available under the trade designations AFFINITY Plastomers and ENGAGE Elastomers (The Dow Chemical Company) and EXACT (ExxonMobil Chemical Co.)). Propylene-based copolymers (for example, polymers available under the trade designation VERSIFY Plastomers & Elastomers (The Dow Chemical Company) and VISTAMAXX (ExxonMobil Chemical Co.) can also be useful as components in blends comprising an inventive polymer.

Applications

The polymers of this invention may be employed in a variety of conventional thermoplastic fabrication processes to produce useful articles, including, but not limited to, coatings, such as extrusion coatings; monolayer and multilayer films; molded articles, such as blow molded, injection molded, or rotomolded articles; fibers; and woven or nonwoven fabrics. An inventive polymer may be used in a variety of films, including but not limited to, clarity shrink films, collation shrink films, cast stretch films, silage films, stretch hood, sealants, and diaper backsheets. Other suitable applications include, but are not limited to, wires and cables, gaskets and profiles, adhesives; footwear components, and auto interior parts.

Definitions

Unless stated to the contrary, implicit from the context, or customary in the art, all parts and percents are based on weight, and all test methods are current as of the filing date of this application.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, may comprise at least one comonomer.

The term "ethylene-based interpolymer" refers to an interpolymer that comprises a majority amount of polymerized ethylene, based on the weight of the interpolymer, and comprises at least one comonomer.

The term "ethylene-based copolymer" refers to an copolymer that comprises a majority amount of polymerized ethylene, based on the weight of the interpolymer, and a comonomer, as the only monomer types.

The term "propylene-based polymer" refers to a polymer that comprises a majority amount of polymerized propylene, based on the weight of the polymer, and, optionally, may comprise at least one comonomer.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

Test Methods

Melt Index—Melt index, or I2, was measured in accordance by ASTM D 1238 (Procedure B), Condition 190° C./2.16 kg, and was reported in grams eluted per 10 minutes. The I10 was measured in accordance with ASTM D 1238, Condition 190° C./10 kg, and was reported in grams eluted per 10 minutes.

Melt Strength

Melt strength was measured at 190° C., using a Göettfert Rheotens 71.97 (Göettfert Inc.; Rock Hill, S.C.). The melted sample (about 25 to 50 grams) was fed with a Göettfert Rheotester 2000 capillary rheometer, equipped with a flat entrance angle (180 degrees) of length of 30 mm and diameter of 2 mm. The sample was fed into the barrel (L=300 mm, Diameter=12 mm), compressed and allowed to melt for 10 minutes, before being extruded at a constant piston speed of 0.265 mm/s, which corresponds to a wall shear rate of 38.2 s-1 at the given die diameter. The extrudate passed through the wheels of the Rheotens, located at 100 mm below the die exit, and was pulled by the wheels downward, at an acceleration rate of 2.4 mm/s2. The force (in cN) exerted on the wheels was recorded as a function of the velocity of the wheels (in mm/s). Samples were repeated at least twice, until two curves of the force (in cN) as a function of strand velocity (in mm/s) superimpose, then the curve that had the highest velocity at the strand break was reported. Melt strength was reported as the plateau force (cN) before the strand broke.

MALDI-TOF MS and MALDI-TOF/TOF CID Fragmentation Measurements

All samples were analyzed using a Bruker UltrafleXtreme MALDI-TOF/TOF MS (Bruker Daltronics Inc., Billerica, Mass.), equipped with a 355-nm Nd:YAG laser. Spectra were obtained in the positive ion reflection mode as follows: a) the mass resolution was greater than 20,000 full-width at half-maximum height (fwhm), b) isotopic resolution was observed throughout the entire mass range detected, and c) the laser intensity was set approximately 10% greater than threshold. Instrument voltages were optimized for each spectrum, to achieve the best signal-to-noise ratio. External mass calibration was performed using protein standards (Peptide Mix II) from a Peptide Mass Standard Kit (Bruker Daltronics), and a seven-point calibration method, using Bradykinin (clip 1-7) (m=757.40 Da), Angiotensin II (m=1046.54 Da), Angiotensin I (m=1296.68 Da), Substance P (m=1347.74 Da), ACTH (clip 1-17) (m=2093.09 Da), ACTH (clip 18-39) (m=2465.20 Da), and Somatostatin 28 (m=3147.47 Da), to yield monoisotopic mass accuracy better than $\Delta m = \pm 0.05$ Da. The instrument was calibrated before each measurement to ensure constant experimental conditions.

For the CID fragmentation experiments, argon was used as a collision gas at pressures of $1.5 \times 10^{-6}$ Torr, and the collision energy amounted to 20 keV.[1,2] Here, keV=1000 electron volts (a unit of energy). All spectra were acquired in the reflection mode as follows; a) with a mass resolution greater than 20,000 full-width at half-maximum height (fwhm), and b) isotopic resolution observed throughout the entire mass range detected. The MALDI spectra were run in a dithranol (Aldrich) matrix doped with sodium trifluoroacetate (NaTFA; Aldrich). Samples were prepared using the dried-droplet method, with weight (mg) ratios of 60:10:1 (MALDI matrix:polymer:NaTFA) in tetrahydrofuran (THF, Fisher).[3] After vortexing the mixture for 30 sec, 1 μL of the mixture was pipetted on the MALDI sample plate, and allowed to air dry at room temperature.[3] The MS and MS/MS data were processed using Polymerix 3.0 software supplied by Sierra Analytics (Modesto, Calif.).

References (1) Altuntas, E.; Krieg, A.; Baumgaertel, A., Crecelius, A. C.; Schubert, U. S., J. Polm. Sci., Part A: Polym. Chem. 2013, 51, 1595-1605. (2) Altuntas, E.; Krieg, A.; Crecelius, A. C.; Schubert, U. S., Bruker Application Note # ET-37. (3) Gies, A. P. in Mass Spectrometry in Polymer Chemistry; Barner-Kowollik, C.; Gruendling, T.; Falkenhagen, J.; Weidner, S., Eds; John Wiley & Sons, Ltd.; West Sussex, England, 2012.

$^1$H NMR Determination of Average Mn of Poly(Ethylene Glycol) Dimethacrylate

The nominal Mn of the PEG DMA (Mn 750) was 750, but this value varies from lot to lot. The following method was used to determine the Mn of this PEG DMA used in the experimental section below. Sample Preparation: The samples were prepared by dissolving approximately 50 mg of sample in 2.5 mL of $CDCl_3$, at room temperature, in a NORELL 5 mm NMR tube. Data Acquisition Parameters: $^1$H NMR was performed on a Bruker AVANCE 400 MHz spectrometer, at ambient temperature. A ZG pulse sequence was used with n=16, d1=30, AQ=4, SW=20, and SWH=8012.

Calculations: The spectrum was integrated to give 2 H for the signal corresponding to proton "a" (6.13 ppm, see below). The sum of integrals at 4.30 ppm (ethylene glycol (EG) units near chain ends) and 3.66 ppm (all remaining EG units) corresponds to signals "d"+"e"=4H*Average # EG units/chain. Assuming MW of each EG unit=44.05 g/mole, and the weight of the dimethacrylate end groups corresponds to 154.16 g/mole, the Mn (g/mole) from NMR=(Average # EG units/chain*44.05)+154.16. Using this method, "d"+"e"=49.52, and dividing this value by 4, gives 12.4 Average # EG units/chain. Substituting this value (Average # EG units/chain) in the equation above, the average Mn for this sample calculates to be 700.

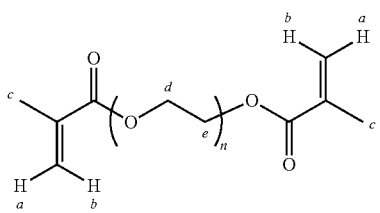

Density

Sample was prepared according to ASTM D 1928. Samples were pressed at 374° F. (190° C.), and 30,000 psi, for three minutes, and then at 70° F. (21° C.) and 30,000 psi for one minute. Density measured using ASTM D792 (annealed density).

Experimental

Materials 1,4-Butanediol dimethacrylate (BDDMA, 95%), available from Sigma-Aldrich Chemical Company as Product Number: 234958, and used as received.

Poly(ethylene glycol) methacrylate (PEG MA, contains 500-800 ppm MEHQ), available from Sigma-Aldrich Chemical Company as Product Number: 409537, and used as received. The estimated Mn, based on MALDI-TOF, is 634 g/mole.

Poly(ethylene glycol) dimethacrylate (PEG DMA, contains 900-1100 ppm MEHQ) available from Sigma-Aldrich Chemical Company as Product Number 437468, and used as received. The Mn=700 by the 1H NMR method (n=12.4).

Poly(ethylene glycol) methyl ether methacrylate (Mn about 500, and contains 100 ppm MEHQ inhibitor and 200 ppm BHT inhibitor) available from Sigma-Aldrich Chemical Company as Product Number: 447943, and used as received.

Initiators (Control LDPE)—Peroxide initiator tert-butyl peroxyacetate (TPA, 20% by weight solution in ISOPAR H) and peroxide initiator di-tert-butyl peroxide (DTBP, 20% by weight solution in ISOPAR H) were combined with ISOPAR E in a second 316 stainless steel supply vessel to produce 8500 mass ppm TPA and 1881 mass ppm DTBP, a ratio of 5:1 mole TPA/mole DTBP. The vessel was padded and de-padded five times with 70 psig nitrogen before use and kept under nitrogen pad during operation.

LDPE Homopolymer (Control)

Ethylene was injected at 5461 gm/hr (195 moles/hr), at a pressure of 1930 bar, into an agitated (1600 rpm) 300 mL, high pressure CSTR reactor, with an external heating jacket set at approximately 215° C. Propylene (CTA) was added to the ethylene stream at a pressure of 69 bar, and at a rate of 111.3 gm/hr (1.64 mole/hr), before the mixture was compressed to 1930 bar, and injected into the reactor. The peroxide initiator was added directly to the reactor, through the sidewall, at a pressure of 1930 bar, and at a rate of $22.0 \times 10^{-2}$ gm/hr (1.66 millimoles/hr) of TPA and $4.8 \times 10^{-2}$ gm/hr (0.33 millimoles/hr) of DTBP. The ethylene conversion to polymer was 13.0 wt %, based on the mass of ethylene entering the reactor, and the average reaction temperature was 241° C. An ethylene-based polymer with a melt index (I2) of 5.6 g/10 min was formed. Approximately 20 lbs of this ethylene-based polymer was collected.

LDPE Made with 1,4-Butanediol Dimethacrylate (Comparative 1)

Monomer—1,4-butanediol dimethacrylate (BDDMA) was loaded into a 316 stainless steel supply vessel, and diluted with ethyl acetate, to produce a final concentration of 8.0 wt %. This vessel was purged with nitrogen for three hours before use and kept under 70 psig nitrogen pad during operation.

Chain Transfer Agent—Propionaldehyde (99%) was loaded into a 316 stainless steel supply vessel, and diluted with ISOPAR E to produce a solution of 26%. The vessel was padded and de-padded five times with 70 psig nitrogen before use and kept under nitrogen pad during operation.

Initiators (Comparative 1)—Peroxide initiator tert-butyl peroxyacetate (TPA, 20% by weight solution in ISOPAR H) and peroxide initiator di-tert-butyl peroxide (DTBP, 20% by weight solution in ISOPAR H) were combined with ISOPAR E in a second 316 stainless steel supply vessel to produce 5000 mass ppm TPA and 1384 mass ppm DTBP, a ratio of 4:1 mole TPA/mole DTBP. The vessel was padded and de-padded five times with 70 psig nitrogen before use and kept under nitrogen pad during operation.

LDPE (Comparative 1)—Ethylene was injected at 8903 gm/hr (318 moles/hr), at a pressure of 1930 bar, into an agitated (1600 rpm) 300 mL, high pressure CSTR reactor, with an external heating jacket set at ~210° C. Propionaldehyde solution (CTA) was added to the ethylene stream at a rate of 43.5 gm/hr (0.19 mole/hr), before the mixture was compressed to 1930 bar, and injected into the reactor. The solution of BDDMA in ethyl acetate was pumped at a pressure of 1930 bar, and at a rate of 1.63 gm/hr (7.2 millimoles/hr) into the ethylene-propylene mixture, before said mixture was injected into the reactor. The peroxide initiator was added directly to the reactor, through the sidewall, at a pressure of 1930 bar, and at a rate of $7.9 \times 10^{-2}$ gm/hr (0.59 millimoles/hr) of TPA and $2.1 \times 10^{-2}$ gm/hr (0.15 millimoles/hr) of DTBP. The ethylene conversion to polymer was 11.8 wt %, based on the mass of ethylene entering the reactor, and the average reaction temperature was 256° C. An ethylene-based polymer with a melt index (I2) of 4.0 g/10 min was formed. Approximately 6 lbs of this ethylene-based polymer was collected.

LDPE Made with Polyethyleneglycol Dimethacrylate (Comparative 2)

Monomer—Undiluted poly (ethylene glycol) dimethacrylate (PEG DMA) was loaded into a 316 stainless steel supply vessel, and diluted with ethyl acetate, to produce a final concentration of 2.2 wt %. Based on $^1$H NMR analysis, this monomer sample had an average Mn=700. This vessel was purged with nitrogen for three hours before use and kept under 70 psig nitrogen pad during operation.

Initiators (Comparative 2)—Peroxide initiator tert-butyl peroxyacetate (TPA, 20% by weight solution in ISOPAR H) and peroxide initiator di-tert-butyl peroxide (DTBP, 20% by weight solution in ISOPAR H) were combined with ISOPAR™ E in a second 316 stainless steel supply vessel to produce 8500 mass ppm TPA and 1881 mass ppm DTBP, a ratio of 5:1 mole TPA/mole DTBP. The vessel was padded and de-padded five times with 70 psig nitrogen before use and kept under nitrogen pad during operation.

LDPE Copolymer (Comparative 2)—Ethylene was injected at 8903 gm/hr (318 moles/hr), at a pressure of 1930 bar, into an agitated (1600 rpm) 300 mL, high pressure CSTR reactor, with an external heating jacket set at ~210° C. Propylene (CTA) was added to the ethylene stream at a pressure of 69 bar, and at a rate of 82.43 gm/hr (1.96 mole/hr), before the mixture was compressed to 1930 bar, and injected into the reactor. The solution of PEG DMA 750 in ethyl acetate was pumped at a pressure of 1930 bar, and at a rate of 5.85 gm/hr (8.3 millimoles/hr) into the ethylene-propylene mixture, before said mixture was injected into the reactor. The peroxide initiator was added directly to the reactor, through the sidewall, at a pressure of 1930 bar, and at a rate of 16.1×10.2 gm/hr (1.22 millimoles/hr) of TPA and 3.6×10$^{-2}$ gm/hr (0.25 millimoles/hr) of DTBP. The ethylene conversion to polymer was 13.3 wt %, based on the mass of ethylene entering the reactor, and the average reaction temperature was 244° C. An ethylene-based polymer with a melt index (I2) of 5.7 g/10 min was formed. Approximately 20 lbs of this ethylene-based polymer was collected.

LDPE Made with Polyethyleneglycol Methyl Ether Methacrylate (Comparative 3)

Monomer—Undiluted poly (ethylene glycol) methyl ether methacrylate was loaded into a 316 stainless steel supply vessel, and diluted with ethyl acetate, to produce a final concentration of 8.0 wt %. This vessel was purged with nitrogen for three hours before use, and kept under 70 psig nitrogen pad during operation.

Initiators (Comparative 3)—Peroxide initiator tert-butyl peroxyacetate (TPA, 20% by weight solution in ISOPAR H) and peroxide initiator di-tert-butyl peroxide (DTBP, 20% by weight solution in ISOPAR H) were combined with ISOPAR E in a second 316 stainless steel supply vessel to produce 8500 mass ppm TPA and 1881 mass ppm DTBP, a ratio of 5:1 mole TPA/mole DTBP. The vessel was padded and de-padded five times with 70 psig nitrogen before use and kept under nitrogen pad during operation.

LDPE Copolymer (Comparative 3)—Ethylene was injected at 5444 gm/hr (194 moles/hr), at a pressure of 1930 bar, into an agitated (1600 rpm) 300 mL, high pressure CSTR reactor, with an external heating jacket set at ~206° C. Propylene (CTA) was added to the ethylene stream at a pressure of 62 bar, and at a rate of 48.6 gm/hr (1.16 mole/hr), before the mixture was compressed to 1930 bar, and injected into the reactor. The solution of PEG MA 500 in ethyl acetate was pumped at a pressure of 1930 bar, and at a rate of 14.5 gm/hr (29 millimoles/hr) into the ethylene-propylene mixture, before said mixture was injected into the reactor. The peroxide initiator was added directly to the reactor, through the sidewall, at a pressure of 1930 bar, and at a rate of 22.0×10$^{-2}$ gm/hr (1.66 millimoles/hr) of TPA and 4.8×10$^{-2}$ gm/hr (0.33 millimoles/hr) of DTBP. The ethylene conversion to polymer was 13.2 wt %, based on the mass of ethylene entering the reactor, and the average reaction temperature was 240° C. An ethylene-based polymer with a melt index (I2) of 4.1 g/10 min was formed. Approximately 20 lbs of this ethylene-based polymer was collected.

LDPE Made with Polyethyleneglycol Dimethacrylate+Polyethyleneglycol Methacrylate (Inventive 1)

Monomer—Undiluted poly(ethylene glycol) methacrylate (PEG MA) was loaded into a 316 stainless steel supply vessel, and diluted with ethyl acetate, to produce a final concentration of 40 wt %. Based on MALDI-TOF mass spec analysis, undiluted PEG MA is a mixture of several materials, including 61 wt % poly(ethylene glycol) methacrylate (estimated Mn=634 g/mole) and 16 wt % poly(ethylene glycol) dimethacrylate (estimated Mn=789 g/mole) and 19% poly(ethylene glycol) (estimated Mn=684 g/mole); each wt % based on the total weight of the undiluted PEG MA sample. This vessel was purged with nitrogen for three hours before use, and kept under 70 psig nitrogen pad during operation.

Initiators—Peroxide initiator tert-butyl peroxyacetate (TPA, 20% by weight solution in ISOPAR H) and peroxide initiator di-tert-butyl peroxide (DTBP, 20% by weight solution in ISOPAR H) were combined with ISOPAR E in a second 316 stainless steel supply vessel to produce 6500 mass ppm TPA and 1440 mass ppm DTBP, a ratio of 5:1 mole TPA/mole DTBP. The vessel was padded and de-padded five times with 70 psig nitrogen before use, and kept under nitrogen pad during operation.

LDPE Copolymer—Ethylene was injected at 7264 gm/hr (259 moles/hr), at a pressure of 1930 bar, into an agitated (1600 rpm) 300 mL, high pressure CSTR reactor, with an external heating jacket set at approximately 230° C. Propylene (CTA) was added to the ethylene stream at a pressure of 62 Bar, and at a rate of 196 gm/hr (4.66 mole/hr), before the mixture was compressed to 1930 bar, and injected into the reactor. The solution of PEGMA in ethyl acetate was pumped at a pressure of 1930 bar, and at a rate of 44.3 gm/hr into the ethylene-propylene mixture, before said mixture was injected into the reactor. This corresponds to 9.0×10$^{-3}$ moles/hr of poly(ethylene glycol) dimethacrylate (Mn=789) and 4.7×10$^{-2}$ moles/hr of poly(ethylene glycol) methacrylate (Mn=634). The peroxide initiator was added directly to the reactor, through the sidewall, at a pressure of 1930 bar, and at a rate of 26.7×10$^{-2}$ gm/hr (2.03 millimoles/hr) of TPA and 5.9×10$^{-2}$ gm/hr (0.41 millimoles/hr) of DTBP. The ethylene conversion to polymer was 15 wt %, based on the mass of ethylene entering the reactor, and the average reaction temperature was 243° C. An ethylene-based polymer with a melt index (I2) of 3.9 g/10 min was formed. Approximately 200 lbs of this ethylene-based polymer was collected. Results are shown in Table 1. It has been unexpectedly discovered that ethylene-based polymer of the inventive example had "melt strength increases" of at least 50% greater than the ethylene-based polymers of the comparative examples and the control.

TABLE 1

Polymerization Results (*Approx. density)

| Ex. | Mole Ratio of RMA Monomer/ Ethylene × 10$^6$ | Mole Ratio of Comonomer/ Ethylene × 10$^6$ | Average Reactor Temp. (° C.) | Ethylene Conv. (wt %) | Melt Index (I2) | Melt Strength (cN) | Density (g/cc) |
|---|---|---|---|---|---|---|---|
| Control | 0 | 0 | 241 | 13.0 | 5.6 | 5.8 | 0.920-0.921* |
| Comp. 1 | 37 | 0 | 256 | 11.8 | 4 | 7.3 | 0.920* |
| Comp. 2 | 26 | 0 | 244 | 13.3 | 5.7 | 8.3 | 0.920* |
| Comp. 3 | 0 | 150 | 240 | 13.2 | 4.1 | 7.5 | — |
| Inv. 1 | 35 | 180 | 243 | 15.1 | 3.9 | 12.8 | 0.9274 |

Inventive Polymerization 2 (Simulation—Tubular Reactor)

A polymerization simulation model with applied reaction scheme and kinetics is described by "Goto et al.," see references below. Other reactor and product modeling frameworks are available through ASPEN PLUS of Aspen Technology, Inc., Burlington, Mass., USA; and PREDICI of Dr. Wulkow Computing in Technology GmbH (CiT), Rastede, Germany. Process and product responses predicted by these model frameworks are determined by the reactor parameters and the applied reaction scheme and kinetic parameters. The applied reaction scheme and kinetic parameters are described below.

The polymerization simulations were achieved with Goto LDPE simulation model, as described in the following: S. Goto et al; Journal of Applied Polymer Science: Applied Polymer Symposium, 36, 21-40, 1981 (Title: Computer model for commercial high pressure polyethylene reactor based on elementary reaction rates obtained experimentally). The kinetic data used by "Goto et al.," was derived from high pressure free radical polyethylene polymerization experiments performed at varying temperature, pressure and polymer concentrations, as described in the following: K. Yamamoto, M. Sugimoto, *Rate constant for long chain-chain branch formation in free-radical polymerization of ethylene*, J. Macromol. Science-Chem., A13 (8), pp. 1067-1080 (1979). The following elementary reaction steps are described by "Goto et al.": i) propagation of ethylene, ii) termination of radicals, iii) backbiting or SCB formation, iv) transfer to polymer or LCB formation, v) beta elimination of secondary radicals leading to vinyl formation, and vi) beta elimination of tertiary radicals leading to vinylidene formation.

See Table 2 for kinetic data for main reactions, where ko is the pre-exponential or frequency factor; Ea is the activation energy, reflecting the temperature dependence; and $\Delta V$ is the activation volume, reflecting the pressure dependence. All kinetic constants are from "Goto et al.," except the ko, Ea and $\Delta V$ values for backbiting, which have been optimized to better reflect the level of methyl branches (as analyzed by C13 NMR technique) in high pressure polyethylene, as a function of pressure and temperature conditions.

TABLE 2

Kinetic Constants for Main Reactions

| | Reaction | | |
|---|---|---|---|
| | ko | Ea | $\Delta V$ |
| | | Units | |
| | m3/hr/kmol | cal/mol | cc/mol |
| Propagation | 5.63E+11 | 10520 | −19.7 |
| Termination | 3E+11 | 3000 | 13 |
| Backbiting | 2.6E+12 | 12130 | −14 |
| Transfer to Polymer | 1.75E+12 | 14080 | 4.4 |
| Beta Elimination of sec rad | 5.82E+11 | 15760 | −22.6 |
| Beta Elimination of tert rad | 8.51E+10 | 14530 | −19.7 |

The kinetic data for selected CTAs are given in Table 3. The kinetic constants haven been calculated with the help of the kinetic constants on the Cs-value (ks/kp), as determined by Mortimer (see references below), and the ethylene propagation kinetics as given by "Goto et al." (see Table 2). The kinetic data for the selected Monomeric CTA is given in Table 3. The kinetics on "Chain transfer to Modifier" describes the CTA functionality, while the monomeric functionality is described by the "Reactivity Ratios."

The polyenes have been described, and modeled, through assigning kinetic r1 and r2 reactivity ratios (see Tables 3 and 4 below). The kinetic r1 and r2 reactivity ratios are, by definition, linked to the ethylene propagation kinetics for their temperature (Ea) and pressure ($\Delta V$) dependencies. In the simulations, it was assumed that the polyenes do not exhibit additional chain transfer activity. Furthermore, for the total consumption, incorporation and T- and/or H-branch (inter- and intra-molecular) formation, it has been assumed that, after incorporation of one functional group, the reactivity of the other functional group is not affected. In reality, the reactivity of second functional group will be decreased after incorporation of the branching agent through its primary functional group in a polymer molecule. However, this assumption will not affect the first part of this study, as described in the tables below. The second part of the study, comprising actual polymerization results and simulations of these, focuses on the incorporation of the rheology modifier in the polymer, and the conversion to H-branches, in order to increase melt strength and G' values of the formed polymer.

TABLE 3

Kinetic Constants for Selected CTA's and PEG MA (Bifunctional Component)

| | Chain Transfer to Modifier | | | Reactivity Ratios | |
|---|---|---|---|---|---|
| Component | kao m3/hr/kgmol | Ea cal/mol | $\Delta V$ cc/mol | r1 (k11/k12) | r2 (k22/k21) |
| Propylene (CTA) | 2.20E+11 | 13220 | −16.7 | 3.10 | 0.77 |
| Isobutane (CTA) | 3.51E+11 | 14020 | −16.7 | 0.00 | 0.00 |
| PEG MA*** | 2.3E11* | 11620* | −16.7* | 0.08** | 12.5** |

*Kinetic parameters to describe reactivity of the CTA group of the PEG MA.
**Kinetic parameters to describe the reactivity of the monomeric group of the PEG MA.
***PEG MA: Polyethyleneglycol methacrylate.

TABLE 4

Reactivity Ratios for Polyenes (Bifunctional Model Components)

| | | | Reactivity Ratios | |
|---|---|---|---|---|
| | | r1B/r1A | r1 (k11/k12) | r2 (k22/k21) |
| BDMA* | Bond A | 1 | 0.08 | 12.50 |
| | Bond B | | 0.08 | 12.50 |
| PEG DMA* | Bond A | 1 | 0.08 | 12.5 |
| | Bond B | | 0.08 | 12.5 |

*BDMA: 1,4-butanediol dimethacrylate.
*PEG DMA: Polyethyleneglycol dimethacrylate Chain transfer activity and comonomer reactivity scheme data are described in the following: P. Ehrlich, G. A. Mortimer, Fundamentals of the free radical polymerization of ethylene, Adv. Polymer Sci., Vol 7, 386-448 (1970); G. Mortimer, Journal of Polymer Science: Part A-1, Chain transfer in ethylene polymerization, Vol. 4, p 881-900 (1966); G. Mortimer, Journal of Polymer Science: Part A-1, Chain transfer in ethylene polymerization, Part IV, Additional study at 1360 atm and 130° C., Vol 8, p1513-1523 (1970); G. Mortimer, Journal of Polymer Science: Part A-1, Chain transfer in ethylene polymerization, Part V, The effect of temperature, Vol 8, p1535-1542 (1970); G. Mortimer, Journal of Polymer Science: Part A-1, Chain transfer in ethylene polymerization, Part V, The effect of pressure, Vol 8, p1543-1548 (1970); and G. Mortimer, Journal of Polymer Science: Part A-1, Chain transfer in ethylene polymerization VII, Very reactive and depletable transfer agents, Vol 10, pp. 163-168 (1972).

Description of Polymerization Scheme for Inventive 2 (Simulation—Tubular Reactor)

FIG. 1 shows a flow scheme of a simulated high pressure polymerization configuration containing a tubular reactor with an ethylene feed distribution of 100/0/0/0. Stream (1) is the fresh ethylene make-up, which is compressed together with the outlet of the Booster by the Primary to stream (2). Stream (2) is combined with high pressure recycle stream (18), and fed to the inlet of the Hyper compressor "Hyper." The Hyper pressurizes the ethylene feed stream to a level sufficient to feed the high pressure tubular reactor (Reactor) through line 9.

Stream (4) depicts the CTA system make-up feed. CTA make-up streams (4) can be fed in the inlet(s), interstage(s), outlet(s) of the Hyper and/or inlet(s) of the reaction zones. Furthermore the CTA can be optionally dosed at the inlet, outlet or interstages of the Primary and/or Booster compressors systems. The CTA system can consist of single and/or multiple components and includes varying compositions. Feed (6) depicts the "PEG DMA/PEG MA" feed. The discharge temperature of the Hyper is typically in the range of 60 to 100° C. The ethylene feed to the first reaction zone is typically preheated to a temperature in the range of 130 to 180° C.

The dimensions and configuration of the reactor are given in Table 5. In the reactor, the polymerization is initiated with the help of free radical initiation systems, injected and/or activated at the inlet of each reaction zone. The maximum temperature in each reaction zone is controlled at a set point, by regulating the concentration and/or feed amount of initiation system at the start of each reaction zone. After finishing the reaction, and having applied multiple cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11) which is sent for further separation to the low pressure separator (LPS). Ethylene stream (15) is cooled and cleaned in stream (17). Stream (16) is a purge stream to remove impurities and/or inerts.

The polymer separated in LPS is further processed in (12). The ethylene removed (13) in the LPS, is fed to the Booster, where, during the compression, condensables such as solvent, lubrication oil and others are collected and removed through stream (14). The outlet of the Booster is combined with make-up ethylene stream (1), and further compressed by the Primary compressor.

Tubular Reactor Simulation of Inventive 2

The inventive example in Table 5 shows a simulation with isobutane as CTA, while applying a mixture of "PEG DMA and PEG MA" as a branching agent and comonomer, respectively, in a tubular high pressure reactor. The process conditions and predicted branching and conversion levels are shown in Table 5. All ethylene and CTA are fed to the front reaction zone. The inlet pressure was 2500 bar, while the pressure drop along the reactor was about 320 bar. PEG DMA and PEG MA concentrations in the ethylene based feed to the front reaction zone were, respectively, 70 and 360 mol ppm.

It is expected that the ethylene-based polymer would have significantly greater melt strength as compared to the following: a) a control ethylene-based polymer polymerized in the absence of PEG DMA and PEG MA, b) a comparative ethylene-based polymer polymerized in the absence of PEG DMA, and c) a comparative ethylene-based polymer polymerized in the absence of PEG MA. Such results would be in accordance with the results shown above for inventive example 1.

The invention claimed is:
1. A process to form an ethylene-based polymer, said process comprising polymerizing a reaction mixture comprising ethylene and at least the following A) and B):
A) a Rheology Modifying Agent (RMA) selected from the following i) through v):
i) RMA1:

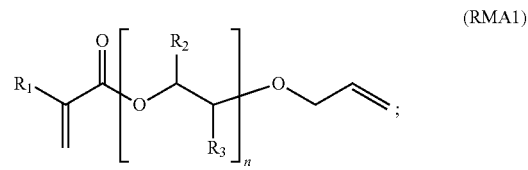

wherein, for RMA1, R1 is H or alkyl, n is from 1 to 50, R2 is selected from H or an alkyl, and R3 is selected from H or an alkyl;
ii) RMA2:

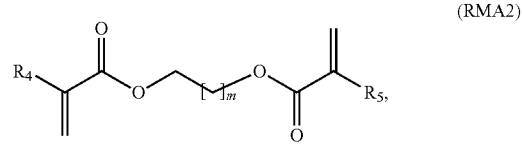

wherein, for RMA2, R4 and R5 are each independently H or an alkyl, and m is from 1 to 50;
iii) RMA3:

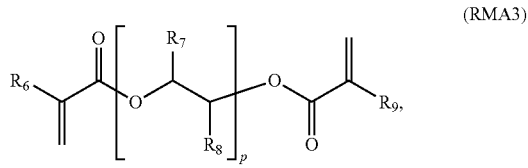

wherein, for RMA3, R6 and R9 are each independently H or an alkyl, p is from 1 to 50; R7 is selected from H or an alkyl, and R8 is selected from H or an alkyl;

TABLE 5

Tubular Reactor Simulation of Inventive Example

| unit | Peak temps °C. | (Re)initiation temps °C. | MI g/10 min | Ethylene conversion simulated % | Simulated LCB #/1000 C. | Simulated conversion to H- or (T-) branches % | Simulated H- or (T-) branch level #/1000 C. |
|---|---|---|---|---|---|---|---|
| | Inside tube diameter 60 mm), Rx-zone length distribution: 400/400/400/400 m and Throughput 60000 kg/hr | | | | | | |
| Inv. 2 | 305 for each rnx zone | 150/248/249/260 | 5 | 36.6 | 4.79 | 99.4 (5.4) | 0.093 (0.026) | iv) RMA4:

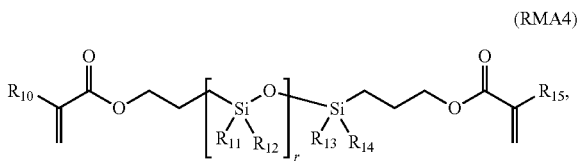
(RMA4)

wherein, for RMA4, R10 and R15 are each independently H or an alkyl, r is from 1 to 100; R11 is selected from H or an alkyl, R12 is selected from H or an alkyl, R13 is selected from H or an alkyl, R14 is selected from H or an alkyl;
  v) any combination of two or more of i) through iv); and
B) at least one comonomer selected from the following:
  a) comonomer 1:

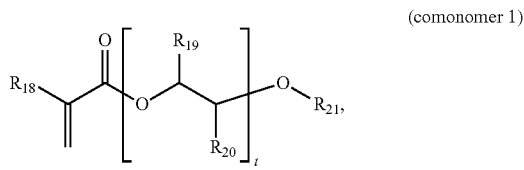
(comonomer 1)

wherein, for comonomer 1, R18 and R21 are each independently H or an alkyl, t is from 1 to 50; R19 is selected from H or an alkyl, and R20 is selected from H or an alkyl;
  b) a combination of comonomer 1 and comonomer 2:

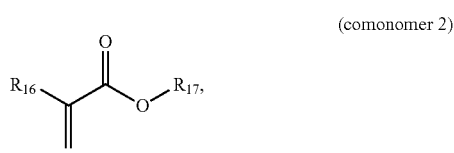
(comonomer 2)

wherein, for comonomer 2, R16 is H or alkyl, and R17 is selected from H or an alkyl.

2. The process of claim 1, wherein the reaction mixture further comprises at least one free-radical initiator.

3. The process of claim 1, wherein then polymerization takes place at a pressure greater than, or equal to, 100 MPa.

4. The process of claim 1, wherein the polymerization takes place in a reactor configuration comprising the following: a) an autoclave reactor, b) a tubular reactor, or c) an autoclave reaction in combination with a tubular reactor.

5. The process of claim 1, wherein A) is a Rheology Modifying Agent (RMA) selected from i), ii), iii) or v).

6. The process of claim 1, wherein A) is a Rheology Modifying Agent (RMA) selected from ii), iii) or v).

7. The process of claim 1, wherein A) is a Rheology Modifying Agent (RMA) selected from iii).

8. A composition comprising the ethylene-based polymer formed from the process of claim 1.

9. The composition of claim 8, wherein the ethylene-based polymer comprises at least the following A') and B'):
  A') one or more units derived from at least one Rheology Modifying Agent (RMA) selected from the following i) through v):
    i) RMA1:

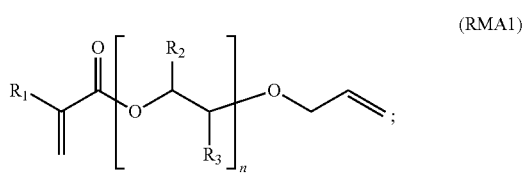
(RMA1)

wherein, for RMA 1, R1 is H or alkyl, n is from 1 to 50, R2 is selected from H or an alkyl, and R3 is selected from H or an alkyl;
    ii) RMA2:

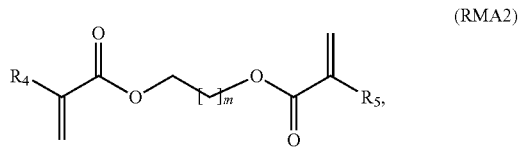
(RMA2)

wherein, for RMA2, R4 and R5 are each independently H or an alkyl, and m is from 1 to 50;
    iii) RMA3:

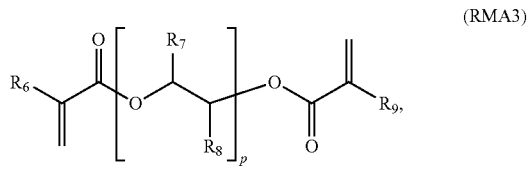
(RMA3)

wherein, for RMA3, R6 and R9 are each independently H or an alkyl, p is from 1 to 50; R7 is selected from H or an alkyl, and R8 is selected from H or an alkyl;
    iv) RMA4:

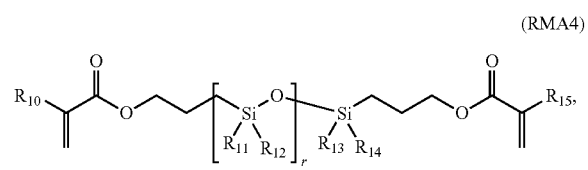
(RMA4)

wherein, for RMA4, R10 and R15 are each independently H or an alkyl, r is from 1 to 100; R11 is selected from H or an alkyl, R12 is selected from H or an alkyl, R13 is selected from H or an alkyl, R14 is selected from H or an alkyl;
    v) any combination of two or more of i) through iv); and
  B') one or more units derived from at least one comonomer selected from the following:
    a) comonomer 1:

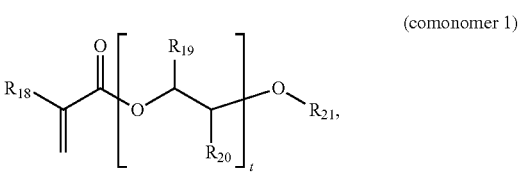
(comonomer 1)

wherein, for comonomer 1, R18 and R21 are each independently H or an alkyl, t is from 1 to 50; R19 is selected from H or an alkyl, and R20 is selected from H or an alkyl;
    b) a combination of comonomer 1 and comonomer 2;

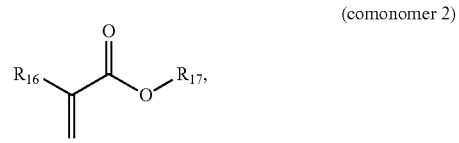
(comonomer 2)

wherein, for comonomer 2, R16 is H or alkyl, and R17 is selected from H or an alkyl.

10. The composition of claim 8, wherein the ethylene-based polymer comprises at least one structure selected from the Structure 1:

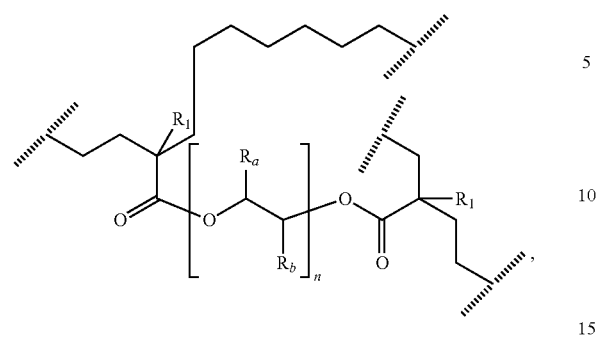
(Structure 1)
wherein, for Structure 1, R1 is selected from H or alkyl, Ra is selected from H or alkyl, and Rb is selected from H or alkyl.
* * * * *